United States Patent [19]

Sugisawa et al.

[11] Patent Number: 4,778,350

[45] Date of Patent: Oct. 18, 1988

[54] HYDRAULIC PUMP ASSEMBLIES

[75] Inventors: Masakazu Sugisawa, Kariya; Hiromu Kuromitsu, Chiryu; Noboru Noguchi, Toyota, all of Japan

[73] Assignees: Aisin Seiki Kabushiki Kaisha; Toyota Jidosha Kabushiki Kaisha, both of Toyota, Japan

[21] Appl. No.: 19,757

[22] Filed: Feb. 27, 1987

[30] Foreign Application Priority Data

Feb. 27, 1986 [JP] Japan .............................. 61-28799[U]

[51] Int. Cl.$^4$ .............................................. F04B 1/04
[52] U.S. Cl. .................................... 417/248; 417/252
[58] Field of Search ............... 417/248, 252, 265, 271, 417/273

[56] References Cited

U.S. PATENT DOCUMENTS

| | | | |
|---|---|---|---|
| 169,999 | 11/1875 | Laney | 417/248 |
| 797,417 | 8/1905 | Engelking | 417/248 X |
| 1,092,359 | 4/1914 | Heinrich | 417/248 X |
| 1,261,437 | 4/1918 | Reavell et al. | 417/248 |
| 1,634,093 | 6/1927 | Clark | 417/248 |
| 2,653,543 | 9/1953 | Mott | 417/252 X |
| 2,705,456 | 4/1955 | Heyman | 417/248 X |
| 4,679,986 | 7/1987 | Duere | 417/248 |

Primary Examiner—Carlton R. Croyle
Assistant Examiner—Ted Olds
Attorney, Agent, or Firm—Oblon, Fisher, Spivak, McClelland & Maier

[57] ABSTRACT

A hydraulic pump assembly includes a cam shaft, a pair of high pressure plunger pumps opposed to each other on a first common axis, each of the high pressure plunger pumps having a first plunger of small diameter perpendicular to the cam shaft for reciprocation by engagement therewith, a low pressure plunger pump arranged on a second axis angularly displaced with respect to the first common axis in a circumferential direction of the cam shaft, the low pressure plunger pump having a second plunger of large diameter perpendicular to the cam shaft for reciprocation by engagement therewith, an accumulator arranged to temporarily store hydraulic fluid under pressure discharged from the low pressure plunger pump, and a relief valve arranged to release an excessive hydraulic pressure from the accumulator for maintaining the hydraulic pressure in the accumulator in a predetermined value. The high pressure plunger pumps are arranged to be supplied with the hydraulic fluid under pressure from the accumulator.

6 Claims, 1 Drawing Sheet

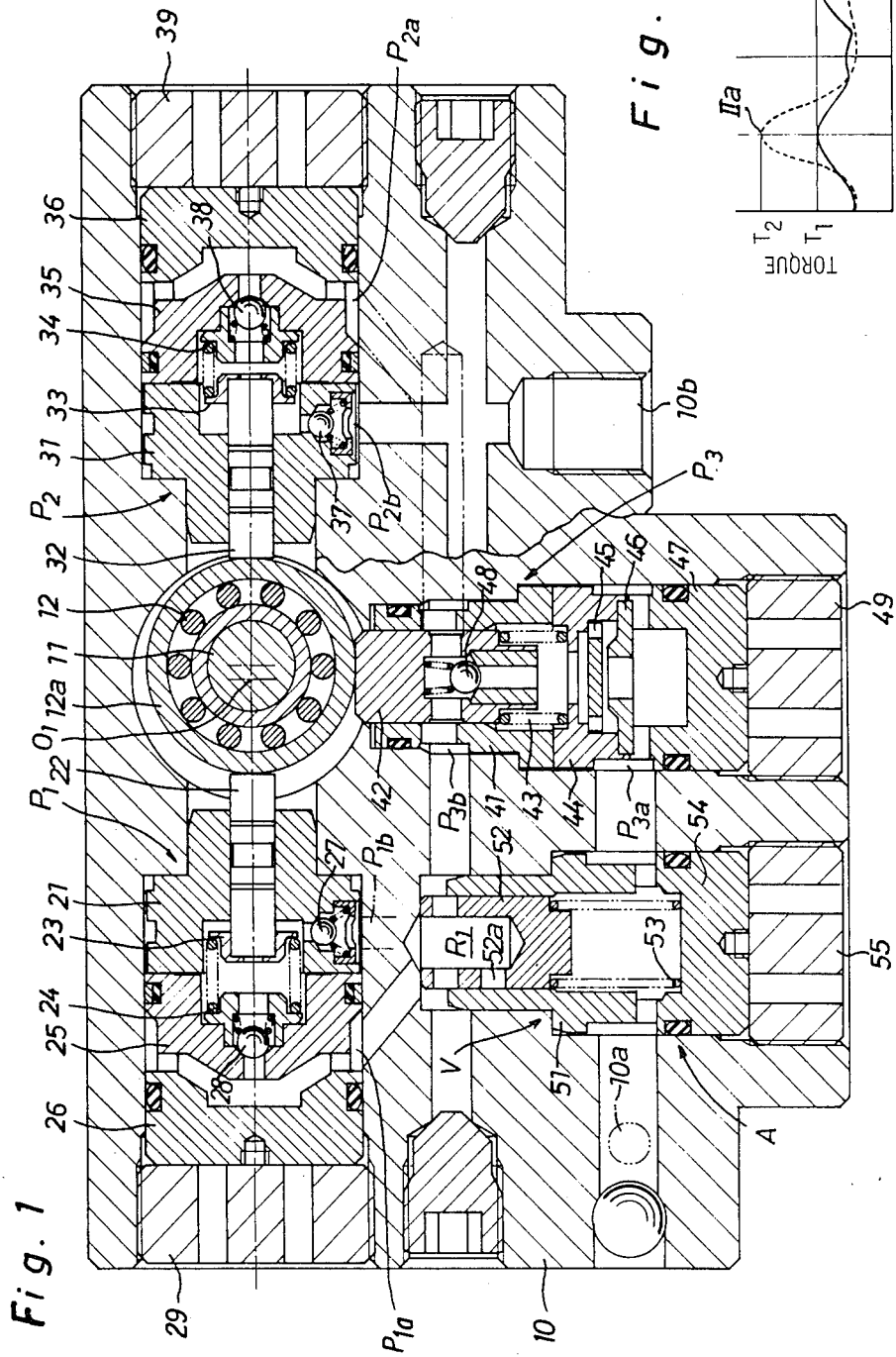

HYDRAULIC PUMP ASSEMBLIES

BACKGROUND OF THE INVENTION

1. Field of the Invention

The present invention relates to hydraulic pump assemblies suitable for supplying hydraulic fluid under pressure to a hydraulic control system for example in a vehicle anti-skid apparatus, and more particularly to a hydraulic two-stage pump assembly of the type which includes low and high pressure plunger pumps arranged to be reciprocated by engagement with a single cam shaft.

2. Description of the Prior Art

In a copending U.S. patent application No. 826,617, filed on Feb. 6, 1986, there has been proposed a hydraulic two-stage pump assembly of this kind which includes low and high pressure plunger pumps opposed to each other on a common axis and arranged perpendicularly to a single cam shaft for reciprocation by engagement with the cam shaft. Such a hydraulic two-stage pump assembly is useful to produce sufficient hydraulic pressure while being itself of small volume and compact construction. It has, however, been found that when the low and high pressure plunger pumps are reciprocated respectively to discharge a predetermined amount of fluid under a predetermined pressure, torque of the cam shaft per one rotation fluctuates as shown by a dotted line in FIG. 2. In discharge stroke of the high pressure plunger pump, there occurs a sudden increase in torque of the cam shaft, as shown by the reference character IIa in FIG. 2. This results in undesired vibration of the pump assembly.

OBJECT OF THE INVENTION

It is, therefore, a primary object of the present invention to provide an improved hydraulic two-stage pump assembly which is capable of suppressing such torque fluctuation of the cam shaft as described above in a simple and compact construction.

SUMMARY OF THE INVENTION

According to the present invention, the primary object is attained by providing a hydraulic pump assembly which comprises a cam shaft, a pair of high pressure plungers pumps opposed to each other on a first common axis, each of the high pressure plunger pumps including a first plunger of small diameter perpendicular to the cam shaft for reciprocation by engagement therewith, a low pressure plunger pump arranged on a second axis angularly displaced with respect to the first common axis in a circumferential direction of the cam shaft, the low pressure plunger pump including a second plunger of large diameter perpendicular to the cam shaft for reciprocation by engagement therewih, an accumulator arranged to store hydraulic fluid under pressure discharged from the low pressure plunger pump, and a relief valve arranged to release an excessive hydraulic pressure from the accumulator for maintaining the hydraulic pressure in the accumulator in a predetermined value. In the pump assembly, the high pressure plunger pumps are arranged to be supplied with the hydraulic fluid under pressure from the accumulator.

BRIEF DESCRIPTION OF THE DRAWINGS

Additional objects, features and advantages of the present invention will be readily appreciated from the following detailed description of a preferred embodiment thereof when considered with reference to the accompanying drawings, in which:

FIG. 1 is a sectional view of a hydraulic two-stage pump assembly in accordance with the present invention; and FIG. 2 is a graph illustrating a relationship between rotary angle of a cam shaft and torque of the cam shaft.

DESCRIPTION OF THE PREFERRED EMBODIMENT

Referring now to FIG. 1 of the drawings, there is illustrated a hydraulic two-stage pump assembly in accordance with the present invention which comprises a common pump housing 10 formed to contain therein a pair of high pressure plunger pumps $P_1$, $P_2$ of small capacity, a single low pressure plunger pump $P_3$ of large capacity, an accumulator A, and a relief valve V. The pump housing 10 is provided with an inlet port 10a for connection to a hydraulic fluid reservoir (not shown) and an outlet port 10b for connection to a hydraulic control system (not shown). The high pressure plunger pumps $P_1$ and $P_2$ are opposed to each other on a common axis and arranged perpendicularly to a cam shaft 11 for reciprocation by engagement with the cam shaft 11. The cam shaft 11 is rotatably mounted within the pump housing 10 to be driven by an electric motor (not shown).

The left-hand high pressure plunger pump $P_1$ is provided with a suction port $P_{1a}$ in communication with a fluid chamber $R_1$ in the accumulator A, and a discharge portion $P_{1b}$ connected to the outlet port 10B by way of a communication passage (not shown) in the pump housing 10. The plunger pump $P_1$ includes a cylinder 21 fixedly disposed within the pump housing 10 perpendicularly to the cam shaft 11, a plunger 22 axially slidably supported by the cylinder 21 and in engagement with the outer race 12a of a needle bearing 12 on the cam shaft 11 under load of a compression coil spring 24, a retainer block 25 coupled with the cylinder 21 in a liquid-tight manner, a closure plug 26 coupled with the retainer block 25 in such a manner as to form therebetween radial passages in communication with the suction port $P_{1a}$, and a fastening nut 29 threaded into the pump housing 10 to retain the closure plug 26, the retainer block 25 and the cylinder 21 in place. The cylinder 21 is provided on its peripheral wall with a ball type exhaust check valve 27, and the retainer block 25 is provided with a ball type suction check valve 28. The compression coil spring 24 has one end supported by a retainer 23 in engagement with the plunger 22 and another end supported by a retainer of the suction check valve 28.

Similarly to the plunger pump $P_1$, the right-hand high pressure plunger pump $P_2$ is provided with a suction port $P_{2a}$ connected to the fluid chamber $R_1$ in accumulator A by way of a communication passage formed in the pump housing 10 as shown by imaginary lines in the figure, and a discharge port $P_{2b}$ in communication with the outlet port 10b. The plunger pump $P_2$ includes a cylinder 31 fixedly disposed within the pump housing 10 perpendicularly to the cam shaft 11, a plunger 32 axially slidably supported by the cylinder 31 and in engagement with the outer race 12a of the needle bearing 12 on the cam shaft 11 under load of a compression coil spring 34, a retainer block 35 coupled with the cylinder 31 in a liquid-tight manner, a closure plug 36 coupled with the retainer block 35 in such a manner as to form radial passages in communication with the suction port $P_{2a}$, and a fastening nut 39 threaded into the pump housing 10 to retain the closure plug 36, the retainer block 35 and the cylinder 31 in place. The cylinder 31 is provided in its peripheral wall with a ball type exhaust check valve 37, and the retainer block 35 is provided with a ball type suction check valve 38. The compression coil spring 34 has one end supported by a retainer 33 in engagement with the plunger 32 and another end supported by a retainer of the suction check valve 38.

The low pressure plunger pump $P_3$ is arranged on an axis angularly displaced at approximately 90° with respect to the common axis in a circumferential direction of the cam shaft 11. The low pressure plunger pump $P_3$ has a displacement capacity larger than the displcement capacity of each of the high pressure plunger pumps $P_1$, $P_2$. The plunger pump $P_3$ is provided with a suction port $P_{3a}$ in communication with the inlet port 10a, and a discharge port $P_{3b}$ in communication with the fluid chamber $R_1$ of accumulator A. The plunger pump $P_3$ includes a cylinder 41 fixedly disposed within the pump housing 10 perpendicularly to the cam shaft 11, a plunger 42 axially slidably supported the cylinder 41 and in engagement with the outer race 12a of the needle bearing 12 on the cam shaft 11 under load of a compression coil spring 43, a retainer block 44 coupled with the cylinder 41 to receive the coil spring 43, a closure plug 47 coupled with the retainer block 44 in such a manner as to form radial passages in communication with the suction port $P_{3a}$, and a fastening nut 49 threaded into the pump housing 10 to retain the cylinder 41, the retainer block 44 and the closure plug 47 in place. The retainer block 44 is provided with a suction check valve 35 which comprises an axially movable valve plate 45 disposed within an axial stepped bore in the retainer block 44, and an annular valve seat 46 fixedly coupled with the retainer block 44. The valve plate 45 is formed at its outer periphery with circumferentially equispaced recesses. The plunger 42 is provided therein with a ball type exhaust check valve 48. In the low pressure plunger pump $P_3$, the plunger 42 is formed larger in diameter than the respective plungers 22, 32 of the high pressure plunger pumps $P_1$, $P_2$.

The accumulator A is arranged to temporarily store hydraulic fluid under pressure discharged from the low pressure plunger pump $P_3$. The accumulator A includes a cylinder 51 fixedly disposed within the pump housing 10 in parallel with the cylinder 41 of the pump $P_3$ to provide the accumulator chamber $R_1$, a hollow plunger 52 axially slidably disposed within the cylinder 51 and in abutment with an internal end wall of the pump housing 10 under load of a compression coil spring 53, a closure plug 54 coupled with the cylinder 51 in such a manner as to form radial passages for fluid communication between the inlet port 10a and the suction port $P_{3a}$, and a fastening nut 55 threaded into the pump housing 10 to retain the cylinder 51 and the closure plug 54 in place. The hollow plunger 52 is formed with a radial relief port 52a to provide the relief valve V for releasing an excessive hydraulic pressure from the accumulator chamber $R_1$ toward the suction port $P_{3b}$ of the pump $P_3$. The relief valve V acts to maintain the hydraulic pressure in the accumulator chamber $R_1$ in a predetermined value.

In operation of the hydraulic two-stage pump assembly, the cam shaft 11 is driven by the electric motor to operate the low and high pressure plunger pumps $P_1$, $P_2$ and $P_3$. Thus, hydraulic fluid under low pressure discharged from the low pressure plunger pump $P_3$ is temporarily stored in the accumulator chamber $R_1$, and in turn, the high pressure plunger pumps $P_1$, $P_2$ are supplied with the hydraulic fluid under low pressure from the accumulator chamber $R_1$ respectively to discharge a predetermined amount of fluid under a predetermined high pressure toward the outlet port 10b. If the hydraulic pressure in accumulator chamber $R_1$ exceeds the predetermined value, the relief valve V releases an excessive hydraulic pressure from the accumulator chamber $R_1$ toward the suction port $P_{3a}$ of the pump $P_3$.

During such operation of the hydraulic two-stage pump assembly, the high pressure plunger pumps $P_1$, $P_2$ are reciprocated on the common axis respectively to discharge the predetermined amount of fluid under the predetermined high pressure. This is effective to suppress torque fluctuation of the cam shaft 11 as shown by a solid line in FIG. 2. Namely, as shown in FIG. 2, the torque of the cam shaft 11 is maintained below a peak level $T_1$ lower than the peak level $T_2$ of torque in the previously proposed pump assembly.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. For example, the relief valve V may be provided separately from the accumulator A. It is to be understood, therefore, that within the scope of the appended claims, the invention may be practiced otherwise than as specifically set forth herein.

What is claimed is:

1. A hydraulic pump assembly comprising:
   (a) a housing provided with an inlet port for connection to a fluid reservoir and an outlet port for connection to a hydraulic control system;
   (b) a single cam shaft rotatably mounted within said housing;
   (c) a pair of high pressure plunger pumps opposed to each other on a first common axis, each one of said pair of high pressure plunger pumps including:
      (i) a first plunger of small diameter arranged perpendicularly to said cam shaft for reciprocation by engagement therewith;
      (ii) a suction check valve arranged to cooperate with said first plunger for permitting the flow of hydraulic fluid towards said first plunger; and
      (iii) an exhaust check valve arranged to cooperate with said first plunger for discharging hydraulic fluid under high pressure therefrom towards said outlet port;
   (d) a low pressure plunger pump arranged on a second axis angularly displaced with respect to said first common axis in a circumferential direction of said cam shaft, said low pressure plunger pump including:
      (i) a second plunger of large diameter arranged perpendicularly to said cam shaft for reciprocation by engagement therewith;
      (ii) a suction check valve arranged to cooperate with said second plunger for permitting flow of hydraulic fluid from said inlet port toward said second plunger; and (iii) an exhaust check valve arranged to cooperate with said second plunger for discharging hydraulic fluid under low pressure therefrom toward said suction check valve of each one of said pair of high pressure plunger pumps;

(e) an accumulator arranged to store therein the hydraulic fluid under low pressure discharged from said exhaust check valve of said low pressure plunger pump so as to supply it to said suction check valve of each one of said pair of high pressure plunger pumps at a predetermined level;

(f) a relief valve arranged to release an excessive hydraulic pressure from said accumulator toward said suction check valve of said low pressure pump for maintaining the hydraulic pressure in said accumulator at the predetermined level; and (g) means for providing fluid communication between said accumulator and said suction check valve of each one of said pair of high pressure plunger pumps.

2. A pump assembly as recited in claim 1, wherein said housing is a common housing formed to contain therein said high and low pressure plunger pumps, said accumulator, and said relief valve.

3. A pump assembly as recited in claim 1, wherein said relief valve is incorporated with said accumulator.

4. A pump assembly as recited in claim 1, wherein said accumulator is arranged in parallel with said low pressure plunger pump.

5. A hydraulic pump assembly comprising:
(a) a single cam shaft;
(b) a pair of high pressure plunger pumps opposed to each other on a first common axis, each one of said pair of high pressure plunger pumps including a first plunger of small diameter arranged perpendicularly to said cam shaft for reciprocation by engagement therewith;

(c) an low pressure plunger pump arranged on a second axis angularly displaced with respect to said first common axis in a circumferential direction of said cam shaft, said low pressure plunger pump including a second plunger of large diameter arranged perpendicularly to said cam shaft for reciprocation by engagement therewith;

(d) an accumulator connected to said low pressure plunger pump to store therein hydraulic fluid under low pressure discharged from said low pressure plunger pump; and (e) a relief valve associated with said accumulator to release an excessive hydraulic pressure from said accumulator for maintaining the hydraulic pressure in said accumulator at a predetermined level;

(f) wherein said pair of high pressure plunger pumps are connected to said accumulator so as to be supplied with the hydraulic fluid under low pressure from said low pressure plunger pump through said accumulator.

6. A pump assembly as recited in claim 5, wherein said low pressure plunger pump is arranged on an axis angularly displaced at substantially 90° with respect to said first common axis.

* * * * *

UNITED STATES PATENT AND TRADEMARK OFFICE
CERTIFICATE OF CORRECTION

PATENT NO. : 4,778,350

DATED : OCTOBER 18, 1988

INVENTOR(S) : MASAKAZU SUGISAWA ET AL

It is certified that error appears in the above-identified patent and that said Letters Patent is hereby corrected as shown below:

In column 2, line 33, delete "portion" and substitute --port--;

line 48, delete "on" and substitute --in--;

In column 3, line 17, delete "displcement" and substitute --displacement--;

line 25, after "supported" insert --by--;

In column 4, line 16, delete "P1" and substitute --$P_1$--;

line 34, after "that" insert --,--;

line 62, delete "large" and substitute --larger--;

In column 6, line 7, delete "an" and substitute --a--.

NOTE: The word "camshaft" should appear as one word in all instances.

Signed and Sealed this

Sixteenth Day of May, 1989

*Attest:*

DONALD J. QUIGG

*Attesting Officer*  *Commissioner of Patents and Trademarks*